April 11, 1961     E. E. JERKINS ET AL     2,979,358
LIFTING DEVICES Filed April 17, 1957     6 Sheets-Sheet 1

United States Patent Office 2,979,358
Patented Apr. 11, 1961

2,979,358

LIFTING DEVICES

Ernest Edward Jerkins, Culcheth, Warrington, and Dennis James Dawson, Glazebrook, England, assignors to The United Kingdom Atomic Energy Authority, London, England Filed Apr. 17, 1957, Ser. No. 653,453

Claims priority, application Great Britain June 15, 1956

4 Claims. (Cl. 294—106)

This invention relates to lifting devices and it is concerned with such devices for retrieving articles from inaccessible places such as at the foot of a long narrow vertical hole.

The invention is principally directed to retrieving articles from vertical channels in the core of a graphite moderated nuclear reactor which gives rise to the problem of locating and securing articles of various shapes which may be at the base of a channel of a few inches in diameter and about forty feet away from the nearest access point. Whilst vertical orientation of a nuclear reactor offers many advantages the reactor can only be maintained in service by obtaining access to the base of the reactor. To install access equipment at the base in addition to conventional equipment at the top of reactor greatly increases the complexity and the cost of the reactor.

The present invention therefore sets out to provide access equipment which reaches to the base of the reactor but is manipulated from the top.

According to the invention a lifting device comprises an elongated hollow body of smooth external contour; a hollow flexible tie attached to one end of the body and adapted to carry the body with its longitudinal axis vertical, a latch mechanism at the other end of the body, a latch-operating member internal to the body arranged to be movable in the direction of the longitudinal axis of the body, an actuating device to cause said latch-operating member to move and connections for energising the actuating device passing along the inside of the hollow flexible tie.

Several embodiments of the device will now be described by way of example with reference to the accompanying drawings in which.

Figure 1:
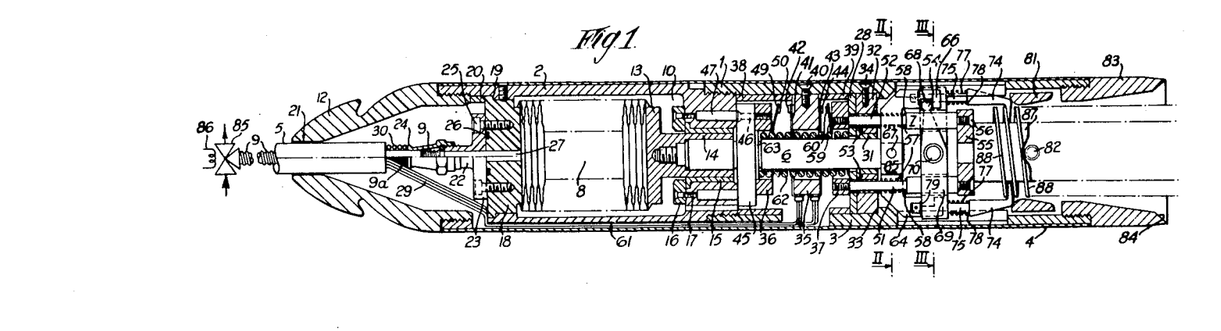
Fig. 1 is a longitudinal sectional elevation of one form of the lifting device.

In general description referring to Fig. 1 the lifting device shown has a hollow mild steel body 1 made of two body parts 2 and 3. The body 1 is covered by a mild steel sheath 4 and is carried in a vertical position by a hollow braided cable 5. Inside the body 1 there is a push rod 6 axially movable to operate a latch contained within the lower body part 3. The push rod 6 is connected with an operating bellows 8 having a coupling with a gas connecting pipe 9 internal to and integral with the cable 5.

In greater detail the body part 2 is cylindrical and has a stepped bore 10. The body part 2 is threaded at one end to accommodate a threaded end cap 12 and is also externally threaded at its other end to screw into the body part 3. The bellows 8 has a lower end cap 13 with a tubular part 14 which bears in a graphite loaded fibre bush 15 located in the narrower part of the bore 10 and retained by a ring 16 and bolts 17. The bellows 8 also has an upper end cap 18 which is located in the body part 2 against an internal step 19 by a spacer sleeve 20 held by the end cap 12. The cable 5 enters the body part 2 through a hole 21 in the end cap 12 and is attached to the upper end cap 18 of the bellows 8 by a cone clamp 22 having a flange 23 and clamping ferrule 24. The flange 23 of the cone clamp 22 is bolted to the upper end cap 18 by bolts 25 and is sealed by a ring 26. A hole 27 coaxial with the cone clamp 22 extends through the upper end cap 18 and forms a connection for the passage of gas from the hollow cable 5 into the bellows 8. The cable 5 is of composite construction and consists of the gas connecting pipe 9 which is in the form of a bellows shaped seamless tube covered by stainless steel braiding 9a. P.T.F.E. (polytetrafluorethylene) insulated conductors 29 and P.T.F.E. dummy conductors 30 are wound around the steel braiding. The conductors 29 and 30 are covered by a silicone rubber moulding which is in turn covered by silicone varnished temperature resistant fabric braiding.

The push rod 6 has its upper end screwed into the lower bellows end cap 13 and its lower end bears in a second graphite loaded fibre bush 31 carried by a bearing plate 32 which is located in the body part 3 against an internal step 33. The fibre bush 31 is retained by a plate 28 and the bearing plate 32 is held by three bolts 34.

Electrical switching arrangements are situated inside the body part 3. The switching arrangements comprise a main contact plate 35 and two movable contact plates 36 and 37 all made of insulating material. The main contact plate 35 which is drilled to accommodate the passage of the push rod 6, is held in the body part 3 between two spacer sleeves 38 and 39 and by three bolts 40. A pair of contact strips 41 with contacts 42 are mounted on one face of the main contact plate 35 (only one of the contact strips 41 is shown as the drawing is in section). A second pair of contact strips 43 (again only one is shown) with contacts 44 are mounted on the other face of the main contact plate 35. The movable contact plate 36 which is annular in shape is bolted to a slidably mounted annular plate 45 by bolts 46. The annular plate 45 carries four plungers 47 which slide in complementary holes in the body part 2. The movable contact plate 36 carries a pair of contact strips 49 (only one shown) with contacts 50. The second movable contact plate 37 is carried on two rods 51 and 52, which bear in fibre bushes 53 located in holes in the bearing plate 32. The rods 51 and 52 are screwed into the contact plate 37 and also carry a switch actuator platform 55 which is bolted on the ends of the rods 51 and 52, by bolts 56. Each of the rods 51 and 52 carries a compression spring 57 which acts between the bearing plate 32 and a shoulder 58 in the corresponding rod (51 or 52). The contact plate 37 carries a pair of contact strips 59 (one only shown) with contacts 60. Three of the P.T.F.E. insulated conductors 29 are led from the cable 5 through a channel 61 in the body part 2 to the main contact plate 35. Electrical connections are made to the contact strips of the main contact plate 35 as follows: one conductor 29 is connected to one of the strips 41, one conductor 29 is connected to one of the strips 43 and the third conductor 29 is connected to the other strip 41 and the other strip 43. The contact strips 49 of the movable contact plate 36 are connected to each other as are the contact strips 59 of the movable contact plate 37.

A compression spring 62 embracing the push rod 6 acts between a washer 63 resting against the annular plate 45 and the bush retaining plate 28.

Figure 2:
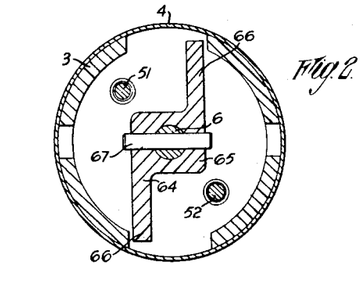
Fig. 2 is a section along the line II—II of Fig. 1.
Figure 3:
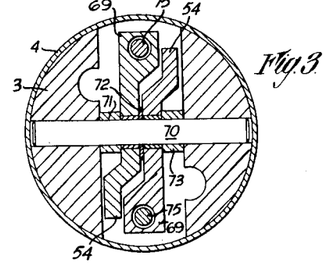
Fig. 3 is a section along the line III—III of Fig. 1.

Now referring also to Fig. 2 a grab actuating member 64 in the form of a centre boss 65 with two offset arms 66 is fixed to the lower end of the push rod 6 by a pin 67. The two arms 66 of the member 64 each have a groove 68 (Fig. 1). Two lever arms 69 are pivotly mounted on a rod 70 and located by spacer bushes 71, 72 and 73 (see Fig. 3). Each of the arms 69 has a cylindrical end piece 54 engaging in the grooves 68 of the actuating member 64 while the other ends of the arms 69 each carry a hook 74. The hooks 74 have guide rods 75 which are slidable in the lever arms 69. The hooks 74 carry compression springs 77 acting between the lever arms 69 and shoulders 78 in the hooks 74. The hooks 74 are retained on the arms 69 by washers and split pins 79. A cylindrical support ring 81 is mounted in the body part 3 adjacent to the hooks 74 by trunnions 82 and a cylindrical mouth piece 83 with a tapered bore and entry 84 is screwed into the open end of the body part 3.

The operation of the device will now be described with reference to the picking up of a fuel element 87 having helical fins 88 of small helix angle from the bottom of a vertical fuel element channel of a nuclear reactor.

The lifting device is suspended from a winch by the cable 5 with the stainless steel braiding carrying the load. An external three way valve 85 (Fig. 1) is set to a position to pass pressurised carbon dioxide through the pipe 9 of the cable 5 to the bellows 8. The three way valve 85 is locked in this position by a latch which unlocks the valve 85 only when an associated solenoid 86 (Fig. 1) is energised. The bellows 8 expands under the gas pressure thus moving the push rod 6 and the associated actuator member 64. The movement of the push rod 6 is transmitted to the annular ring 45 against the action of the compression spring 62 and the contacts 50 of the contact plate 36 (carried by the annular ring 45) are closed with the contacts of the main contact plate 35 to complete an external circuit which indicates to an operator the advanced position of the push rod 6. On advancement of the push rod 6 the lever arms 69 are pivoted (by virtue of their engagement with the grooves 68 in the actuator member 64) to retract the hooks 74 towards the walls of the body part 3. The lifting device is now lowered down the control rod channel and the mouth piece 83 eventually contacts the fuel element 87. The mouth piece 83 having a tapered bore 84 aligns the fuel element 87 so that it enters the open mouth of the lifting device until the switch actuator platform 55 lands on the top of the fuel elements 87. The weight of the lifting device transmitted to the fuel element 87 through the platform 55 causes movement of the platform 55 against the loading of the compression springs 57 to close the contacts 60 of the movable contact plate 37 with the contacts 44 of the main contact plate 35. The closure of the contacts 60 with the contacts 44 completes an external circuit to indicate to an operator that the lifting device has landed on the fuel element 87. The closure of the contacts 60 and 44 also causes the solenoid 86 associated with the locking device of the three way valve 85 to be energised to unlock the valve 85. The valve 85 is operated to vent the bellows 8. The push rod 6 retracts under the loading of the compression spring 62 and the actuator member 64 pivots the lever arms 69 so that the hooks 74 engage with the fins 88 of the fuel element 87. The lifting device is now raised by the cable 5. Initially there is relative movement between the fuel element 87 and the lifting device until the hooks 74 come to rest on the trunnion mounted ring 81 which then supports the weight of the fuel element 87. As the fuel element 87 initially moves relatively to the lifting device the switch actuator platform 55 follows the fuel element under the loading of the compression springs 57 and the contacts 60 of the movable contact plate 37 are broken from the contacts 44 of the main contact plate 35 which de-energises the solenoid 86 of the three-way valve 85 locking device and the valve 85 is thus locked in a position with the bellows 8 vented. The fuel element 87 is lifted out of the fuel element channel and deposited on a support. The weight of the lifting device again moves the switch actuator platform 55 to close the contacts 60 and 44 and energise the solenoid 86 of the valve 85 locking device. The valve 85 is operated to pressurise the bellows 8 which expand and move the push rod 6 to disengage the hooks 74 from the fuel element 87. The lifting device is now lifted from the supported fuel element 87 which can then be removed to a storage point. As the fuel element 87 has helically disposed fins 88, the teeth 74 cannot be guaranteed to engage in the same plane and therefore the support ring 81 is mounted by means of the trunnions 82 so that it can tilt to adjust itself to the position of the hooks 74.

Figure 4:
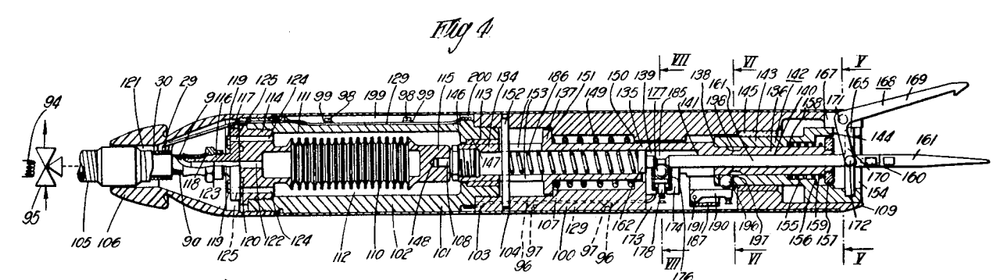
Fig. 4 is a longitudinal sectional elevation of a second form of the lifting device.

The second form of the lifting device shown in Fig. 4 has a hollow mild steel body 101 comprising conjoined tubular parts 102 and 103 covered by a mild steel sheath 104. The body 101 is arranged to be carried in a vertical position by a hollow composite cable 105 which enters the body 101 through a mild steel end cap 106 screwed onto the body part 102. A tubular push rod 107 slidably mounted in the body part 103 co-operates with grab jaws 168 located at the open mouth 109 of the body part 103. A flexible metal bellows 110, expansible under gas pressure and located in the body part 102, has a coupling with a gas connecting tube 9 internal to and integral with the cable 105 and is arranged to operate the push rod 107.

In more detail the tubular body part 102 has a bore 111 stepped in two parts 112 and 113 and is screwed into the body part 103. The metal bellows 110 has an upper end cap 114 which is screwed into the open end of the body part 102 and a lower end cap 115. The cap 114 carries a cone clamp 116 having a flange 117 and a clamping ferrule 118. The cone clamp 116 is bolted to the upper bellows end cap 114 at the flange 117 by bolts 119 and is seated by a rubber ring 120. The cable 105 enters the body part 102 through a hole 121 in the end cap 106 and is clamped to the cone clamp 116 by the clamping ferrule 118. A hole 122 coaxial with the bore 123 of the cone clamp 116 extends through the upper bellows end cap 114 and forms a connection for the passage of gas from the hollow cable 105 into the bellows 110. Vent holes 124 in the upper bellows end cap 114 connect with holes 125 passing through the flange 117 of the cone clamp 116.

The cable 105 is identical with the cable 5 of Fig. 1 and the similar parts are identically numbered.

The tubular push rod 107 is externally stepped in three parts viz. an upper end bearing part 134, a central part 135 of larger diameter and a lower end bearing part 136 of similar diameter to the part 134. The upper end bearing part 134 is divided from the central part 135 by a flange 137 and the central part 135 connects with the lower end bearing part 136 through a step 138. The bore of the push rod 107 is stepped in a part 139 connecting with a part 140 of smaller diameter through an internal step 141. A grab actuator 142 having a tubular bearing sleeve 143 and a head 144 is slidably mounted inside the body part 103 in a graphite loaded fibre bush 145. The push rod 107 is supported at its bearing part 134 by a graphite loaded fibre bush 147 and at its bearing part 136 by the grab actuator 142 within the bearing sleeve 143 of which the push rod bearing part 136 is a sliding fit. The graphite loaded fibre bush 147 is located in the part 113 of the bore 111 in the body part 102. A pin 108 screwed into the upper end 146 of the push rod 107 is a loose fit in a hole 148 in the lower bellows end cap 115. The push rod 107 is biassed against the force of expansion of the bellows 110 by a compression spring 149 which acts between the flange 137 (on the push rod 107) and an internal step 150 in the body part 103. The push rod 107 is also limited in its axial movement under expansion of the bellows 110 by the flange 137 contacting an internal step 151 in the body 103. Rotation of the push rod 107 is prevented by a pin 152 which extends across the body part 103 and passes through a pair of diametrically opposed longitudinal slots 153 in the push rod 107. Th ehead 144 of the grab actuator 142 has a mouth 154 connecting with an internal spring housing 155 of smaller diameter through an internal step 156. A stop 157 in the form of an annular plate is screwed on the end of the push rod 107 where it projects into the mouth 154 of the grab actuator 142. The spring housing 155 connects with the bore of the grab actuator bearing sleeve 143 through an internal step 158. A compression spring 159 held in the spring housing 155 acts between the stop 157 and the internal step 158. A probe 160 having a detachable shank 161 and a head 162 is slidable within and projects from the push rod 107. A compression spring 186 acts between the head 162 of the probe 160 and the pin 152.

Figure 5:
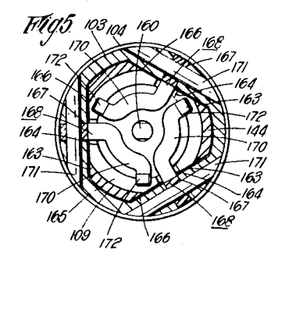
Fig. 5 is a section along the line V—V of Fig. 4.

Referring to Fig. 5 in conjunction with Fig. 4. The head 144 of the grab actuator 142 is basically of tubular form with three symmetrically disposed external flats 163 having end slots 164. An internal circumferential groove 165 is cut in the mouth 154 of the head 144. The internal section of the mouth 109 of the body part 103 matches with the external section of the grab actuator head 144 i.e. the mouth 109 has three internal flats 166 matching with the external flats 163 of the head 144. Three end slots 167 in the mouth 109 are complementary to the slots 164 in the head 144. Three grab jaws 168 having jaw arms 169 and lever arms 170 are pivoted in the end slots 167 of the body part 103 on pins 172. The lever arms 170 pass through the slots 164 in the grab actuator head 144 and are bent out of the plane of rotation of the jaw arms 169 to engage with the internal circumferential groove 165 in the grab actuator head 144. The lever arms 170 are rounded at their ends 172 where they engage in the groove 165.

Figure 6:
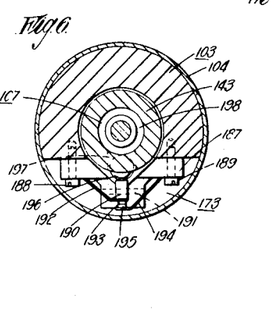
Fig. 6 is a section along the line VI—VI of Fig. 4.
Figure 7:
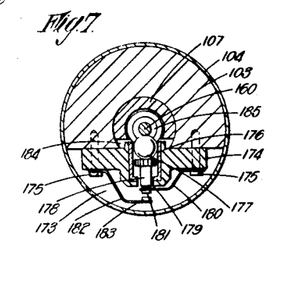
Fig. 7 is a section along the line VII—VII of Fig. 4.

Referring to Fig. 7 in conjunction with Fig. 4. A slot 173 is cut in the wall of the body part 103 to accommodate switching arrangements. The switching arrangements comprise an insulating fibre switch plate 174 bolted across the axial sides of the slot 173 by bolts 175. The switch plate 174 is drilled to accommodate a tubular mild steel liner 176. The liner 176 contains a ball 177 which rests against a plunger 178 slidable in the liner 176. The plunger 178 projects through a hole 179 in the switch plate 174 and bears against a leaf spring 180 bolted to the switch plate 174 by one of the bolts 175. The leaf spring 180 carries a contact 181. A second leaf spring 182 is bolted to the switch plate 174 by the other bolt 175 and carries a contact 183. The ball 177 projects through a slot 184 in the wall of the push rod 107 and either rests in an annular groove 185 in the shank 161 of the probe 160 or not depending on the position of the probe 160 relative to the ball 177. Referring to Fig. 6 in conjunction with Fig. 4 a second fibre switch plate 187 bolted across the sides of the slot 173 by two bolts 188 and 189 carries a fibre switch arm 190 pivoted on a pin 191. The bolt 188 also holds a leaf spring 192 which carries a contact 193 while the bolt 189 also holds a leaf spring 194 which carries a contact 195. The leaf spring 192 biasses the switch arm 191 against a ball 196 held in a hole 197 in the bearing sleeve 143 of the grab actuator 144. The push rod 107 has an annular groove 198 into which the ball 196 can move when the push rod is in such a position that the groove 198 is opposite to the hole 197 in the grab actuator bearing sleeve 143. The three conductors 29 from the cable 105 pass down an axial groove 199 and round a part circumferential groove 200 in the body part 102 to an axial groove 100 in the body part 103. From the axial groove 100 one of the conductors 29 is connected to the contact 183 of the switch plate 175, one is connected to the contact 195 carried by the leaf spring 194 of the switch plate 187 and the third conductor is connected to the contact 184 of the switch plate 175 and to the contact 193 of the switch plate 187. The conductors 29 are retained in the axial groove 199 of the body part 2 by clips 99 and bolts 98 while in the groove 100 of the body part 3 they are retained by clips 96 and bolts 97.

The use of this lifting device to pick up an object from a long narrow vertical hole such as a fuel element channel in a nuclear reactor will now be described.

The device is suspended by means of the cable 105 from a cable winch and the bellows 110 is expanded as shown in Fig. 4 by operating a three way valve 95 (Fig. 4) to pass compressed carbon dioxide into the bellows 110 through the cable 105. The three way valve 95 is locked in this position by an electromagnetic locking device including a solenoid 94. The valve 95 can only be unlocked for operation when the solenoid 94 is energised. The expansion of the bellows 110 holds the push rod 107 in an advanced position with the flange 137 held against the internal step 151 of the body part 103. The spring 149 is held compressed between the flange 137 and the internal step 150 in the body part 103. As the push rod 107 moves to the advanced position on expansion of the bellows 110 the step 138 of the push rod 107 presses on the sleeve 143 of the actuator 142 to open the jaws 168. The jaws 168 remain held open while the bellows 110 remains expanded. The probe 160 is located by the compression spring 186 so that the ball 177 of the switchplate 174 is held in the annular groove 188 of the probe 160 and the contacts 181 and 183 are open. The relative positions of the push rod 107 and the grab actuator 142 are such that the ball 196 is held in the hole 197 of the grab actuator bearing sleeve 143. The ball 196 holds the switch arm 190 so that the contacts 193 and 195 are closed. The lifting device is lowered down the hole from which an object is to be retrieved by means of the cable 105. The probe 160 is the first part of the grab to make contact with the object to be picked up and when this occurs the probe 160 is arrested by the object while the lifting device continues to move downwards compressing the spring 186. Thus relative movement occurs between the probe 110 and the push rod 107 within which the probe 160 is slidable. The ball 177 is forced down the liner 176 of the switch plate 174 depressing the plunger 178 to close the contacts 181 and 183. The closure of the contacts 181 and 183 completes a circuit which gives indication that the lifting device has made contact with the object to be picked up, and energises the solenoid 94 so that the three way valve 95 is unlocked and may be operated to vent the bellows 110 to atmosphere. Thus the bellows 110 is depressurised and the push rod 107 retracts under the loading of the compression spring 149. The grab actuator 142 retracts with the push rod 107 and closes the jaws 168 by virtue of their engagement with the internal slot 165. If the jaws 168 engage with the object to be picked up the grab actuator 142 is arrested and relative movement occurs between the push rod 107 and the grab actuator 142 compressing the spring 159 until the stop 157 on the push rod 107 engages with the internal step 156 in the grab actuator head 144 thus holding the jaws 168 engaged with the object. The relative movement of the push rod 107 and the grab actuator 142 bring the groove 198 in the push rod 107 into line with the hole 197 in the grab actuator bearing sleeve 143. The ball 196 moves into the groove 198 allowing the contacts 193 and 195 to open. The opening of contacts 193 and 195 gives external indication that the jaws 168 are engaged with the object to be picked up. The lifting device is now raised by the cable 105 to lift the object. However if the jaws 168 do not engage with the object no relative movement occurs between the push rod 107 and the grab actuator 142. Thus the contacts 193 and 195 remain closed indicating non-engagement of the jaws 168 with the object.

Figure 8:
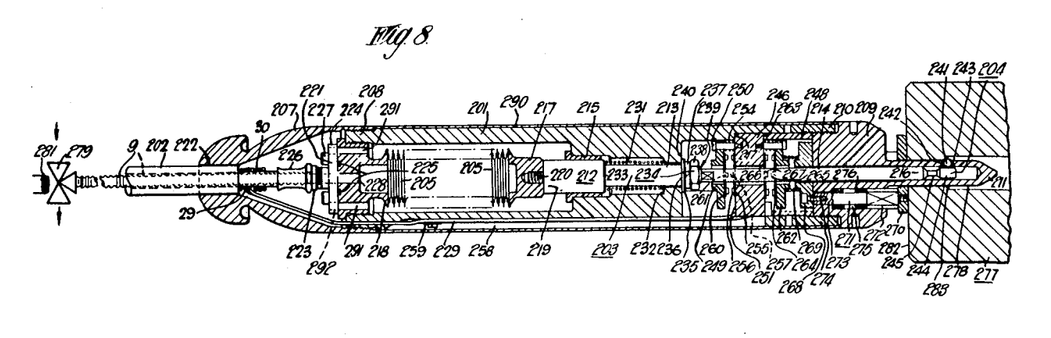
Fig. 8 is a longitudinal sectional elevation of a third form of the lifting device.

The third form of the lifting device shown in Fig. 8 has a hollow mild steel body 201 covered by a smooth cylindrical mild steel sheath 290. The body 201 is carried in a vertical position by a hollow braided cable 202 identical with the cable 5 of Fig. 1 and the similar parts are identically numbered. Inside the body there is a push rod 203 axially movable to control the radial movement of a ball catch 204. The rod 203 is connected with an operating bellows 205 having a coupling with a gas connecting pipe 9 internal to and integral with the cable 202.

In more detail, a mild steel end cap 207 is screwed on to the upper end 208 of the body 201 and a second mild steel end cap 209 is screwed on to the other end 210 of the body 201. A hollow tubular spigot 211 is formed integral with the end cap 209. The push rod 203 is formed in three main parts, a bearing part 212, a centre part 213 and a plunger part 214. The push rod 203 is supported at its bearing part 212 in a graphite loaded fibre bush 215 and at the end 216 of the plunger part 214 by the spigot 211 within which the end 216 of the push rod 203 is a sliding fit. The flexible metal bellows 205 has end caps 217 and 218 and is mounted coaxially within the body 201. The end cap 217 is attached to one end 219 of the push rod 203 by a bolt 220. The end cap 218 of the bellows 205 is formed integral with an end plug 221 which screws into the end 208 of the body 201, vent holes 291 are provided in the end plug 221. The cable 202 enters the body 201 through a hole 222 in the end cap 207 and is attached to the end plug 201 by a cone clamp 223 having a flange 224 and a clamping ferrule 226. The flange 224 is bolted to the end plug 221 by bolts 227 and sealed by a ring 225. The flange 224 has vent holes 292 connecting with the vent holes 291. A hole 228 coaxial with the cone clamp 223 extends through the end plug 221 and forms a connection for the passage of gas from the pipe 9 of the hollow cable 202 into the bellows 205.

A coil compression spring 231 embraces the part 213 of the push rod 203 and is held in compression between an internal face 232 of the body 201 and the step 233 between the bearing part 212 and the part 213 of the push rod 203. A stop 234 is associated with the push rod 203 to limit its retraction to a point where the bellows 205 attached to the push rod 203 is relaxed to only a slightly expanded condition. The stop 234 comprises a washer 235 which is held in position against the step 236 between the parts 213 and 214 of the push rod 203 by a split washer 237 and a nut 238 which screws on a threaded portion 239 of the push rod 203. The washer 235 abuts against a face 240 within the body 201 when the push rod 203 is in the fully retracted position.

Referring now to the spigot 211, three hardened balls 241 are retained in holes 242. The balls 241 are set at 120 degree intervals around the circumference of the spigot 211. The balls 241 have a limited radial movement as determined in the outward direction by lips 243 and in the inward direction by a cylindrical part 244 of the push rod 203 or a circular groove 245 when the push rod 203 is depressed. In the position shown in the drawing the balls 241 project from the holes 242 by about one sixth of their diameter. When the balls 241 move into the groove 245 they do not project at all.

Electrical switching arrangements are situated in the body 201 in the neighbourhood of the plunger part 214 of the push rod 203. The switching arrangements comprise a main contact plate 246 made from insulating material and drilled to accommodate the passage of the part 214 of the push rod 203. The main contact plate 246 abuts against an internal face 247 in the body 201 and is held by a spacer sleeve 248 and the end cap 209. A movable contact plate 249 parallel with the main contact plate 246 is located to move on three bolts 250 screwed into the face 251 of the main contact plate 246. Three compression springs 254 are carried on spacer bushes 252 between the fixed main contact plate 246 and the movable contact plate 249. A pair of contact strips 255 are bolted to the main contact plate 246 on the face 251 by bolts 256 (only one of the strips 255 is shown as the drawing is in section). The contact strips 255 carry contacts 257. The movable contact plate 249 has a pair of contact strips 260, similar to the contact strips 255, with contacts 261 adapted to make contact with the contacts 257 when the movable contact plate 249 is moved towards the main contact plate 246 (only one of the contact strips 260 is shown). The contact strips 260 of the plate 249 are electrically connected to each other. A second movable contact plate 262 is mounted in a similar manner to the contact plate 249 on the other face of the main contact plate 246. The second contact plate 262 carries a pair of contact strips 264 with contacts 265 similar to the contact strips and contacts of the contact plate 249. The contact strips 264 and on the second contact plate 262 are electrically connected to each other. The main contact plate 246 also has contact strips 266 mounted on its other face carrying contacts 267 adapted to make contact with contacts 265 in the plate 262.

A switch actuator plate 268 is mounted in parallel relationship with the movable contact plate 262 and is connected with the plate 262 by a compression spring 269 acting between the contact plate 262 and the actuator plate 268. The actuator plate 268 is connected to an external annular plate 270 by means of three plungers 271. The plungers 221 have two main parts i.e. a main bearing part 272 and a part 273 of smaller circular cross section than the part 272. The three plungers 271 are attached to the actuator plate 268 by bolts 274.

Three of the P.T.F.E. insulated conductors 29 are led through a channel 258 in the main body 201 to the main contact plate 246. Electrical connections are made between the P.T.F.E. insulated conductors 29 and the contact strips 255 and 266 as follows: one conductor is made to one strip 255, a second conductor is made to one strip 266 and the third conductor is made to the other strip 255 and the other strip 266. The conductors 29 are held in the channel 258 by cable clamps 259.

The plungers 291 are screwed into the external annular plate 270. The end cap 209 has three holes 275 to accommodate the plungers 271. The bearing part 272 of each of the plungers 271 is a sliding fit in a part of one of the holes 275 and a compression spring 276 is carried by each of the parts 273 of the plungers 271 and acts between the step in plunger 271 and a step in the end cap 209.

The operation of the lifting device will now be described in relation to the recovery of a stool 277 (shown in Fig. 8 in engagement with the lifting device) having a stepped cavity 278, the stool 277 being situated at the foot of a vertical control rod hole in the core of a graphite moderated nuclear reactor. The lifting device is suspended from a winch by the cable 202 with the stainless steel braiding of the cable 202 carrying the load. A three way valve 279 is operated to pass carbon dioxide under pressure through the pipe 206 of the cable 202 into the bellows 205. The three way valve 279 is locked in this position by a safety locking device which is unlocked when a solenoid 281 is energized. The bellows 105 expands under the gas pressure and the push rod 103 is moved so that the balls 241 can enter the groove 245 in the push rod 203. The movement of the push rod 203 under the action of the bellows 205 moves the contact plate 249 by means of the stop 234 on the push rod 203. The movement of the contact plate 249 is sufficient to bring contacts 261 and 257 together to close an external circuit which indicates to an operator the advanced position of the push rod 203. The lifting device is now lowered by means of the winch and cable 202 into a vertical control rod hole until the spigot 211 of the lifting device enters the stepped cavity 278 of the stool 277. The lifting device is now lowered further until the plate 270 comes in contact with the face 282 of the stool 277. The annular plate 270 is arrested by the face 282 of the stool 277 and the main part of the lifting device moves downward under its own weight relative to the plate 270 until the plate 270 comes in contact with the end cap 209. The movement of the annualar plate 270 is transmitted by the plungers 271 to the switch actuator plate 268 which moves the contact plate 262 towards the main contact plate 246 and the contacts 265 of the contact plate 262 are closed with the contacts 267 of the main contact plate 246. This closes a circuit to indicate to the operator that the lifting device is fully inserted into the stool 277. The closing of contacts 265 and 267 also energises the solenoid 281 to unlock the locking device of the three way valve 279. The valve 279 can now be operated to vent the bellows 205 and the push rod 203 retracts under the loading of the compression spring 231 to a position where the push rod 203 holds the balls 241 in the holes 242 of the spigot 211 so that they project slightly. The lifting device is now raised, spigot 211 raising the stool 277 by engagement of the balls 241 with an internal step 283 in the cavity. As the lifting device is initially raised the spigot 211 moves a short distance relatively to the cavity 278 and the annular plate 270 follows the relatively receding face 282 of the stool 277 and the contacts 265 of the contact plate 262 break with the contacts 267 of the main contact plate 246. The breaking of the contacts 265 and 267 causes the solenoid 281 to be de-energised and thus the three way valve 279 is locked by the locking device in a position with the bellows 205 vented to atmosphere and thus the bellows 205 cannot be inflated whilst the lifting device is carrying the stool 277. The stool 277, is withdrawn from the control rod hole and lowered on to a support. The weight of the main part of the lifting device again moves the plate 270 to close contacts 265 of contact plate 262 with the contacts 267 of the main contact plate 246, and again the closing of contacts 265 and 267 energises the solenoid 281 to unlock the locking device of the three way valve 279. The valve 279 is now operated to pressurise the bellows 205 and thus release the lifting device from the supported stool 277.

Figure 9:
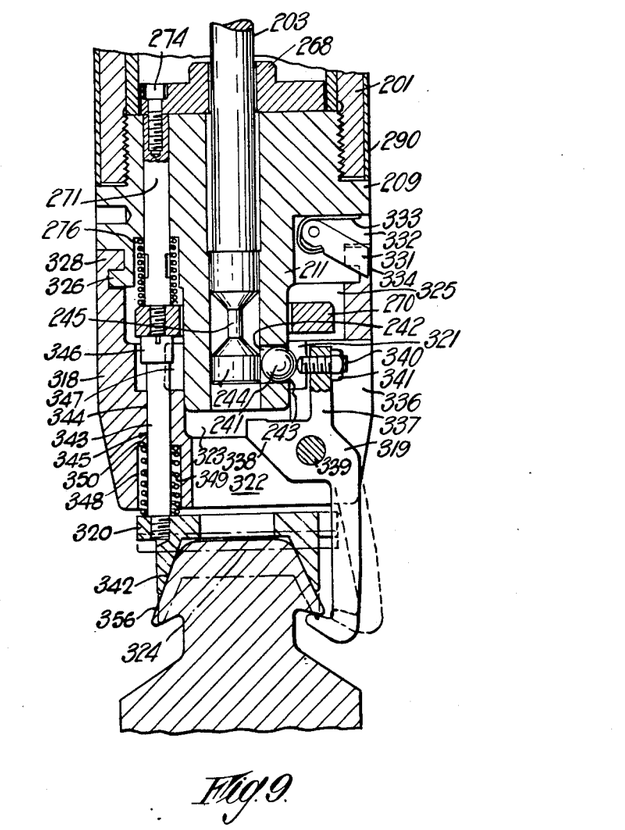
Fig. 9 is a sectional elevation of an adaptor head suitable for attachment to the lifting device shown in Fig. 8.
Figure 10:
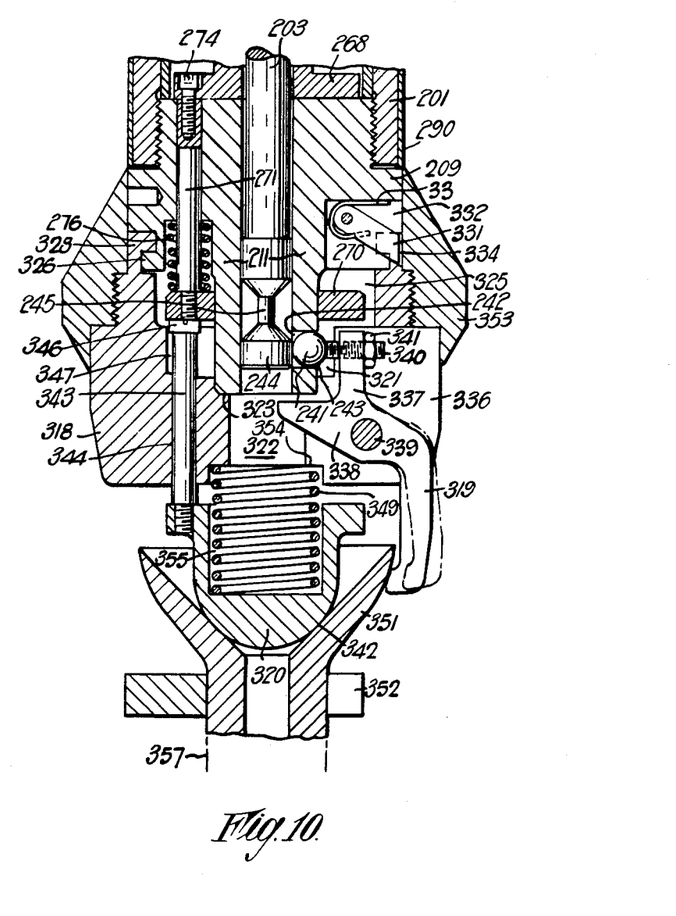
Fig. 10 is a sectional elevation of a second adaptor head also suitable for attachment to the lifting device shown in Fig. 8.

Figs. 9 and 10 show adaptor heads fitted to a lifting device similar to that described above in relation to Fig. 8. The components of this lifting device as shown in Fig. 9 and 10 are identified by the same numerals as used in Fig. 8.

Figure 11:
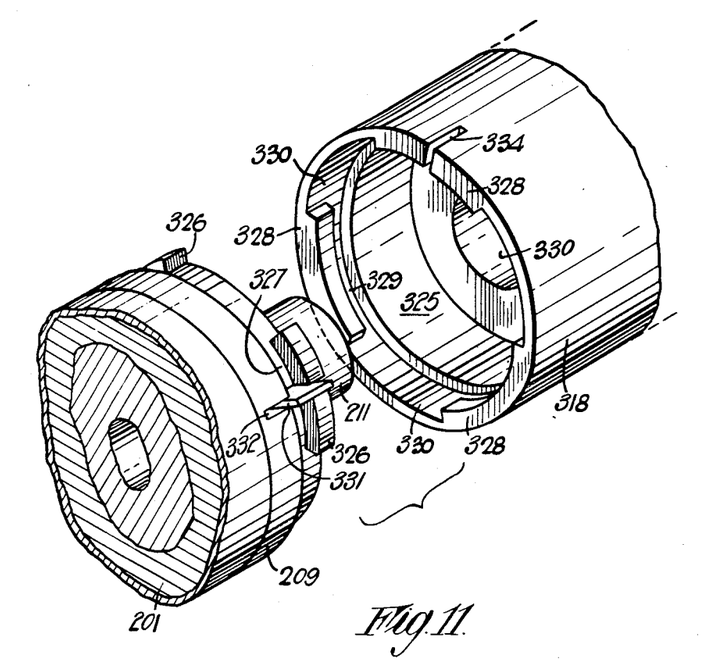
Fig. 11 is a perspective view showing the mode of engagement of the adaptor heads shown in Figs. 9 and 10 with the lifting device shown in Fig. 8.

Fig. 9 shows an adaptor head suitable for picking up a control rod from the bottom of a control rod channel in a nuclear reactor. The adaptor head comprises a tubular body 318 having three pivoted jaws 319 and a control rod locator nose 320. The body 318 is internally stepped in four parts namely a mouth 322, a spigot housing 323, a ball housing 321 and a socket part 325. The adaptor head is fitted to the lifting device by a bayonet fitting which is illustrated in Fig. 11. Referring to Fig. 11 the lower end cap 209 of the lifting device is modified to have three external teeth 326 backed by a circumferential groove 327. The socket part 325 of the adaptor body 318 has three internal teeth 328 backed by an internal circumferential groove 329. The external teeth 326 of the lower end cap 209 are complementary in size and shape to the spaces 330 between the internal teeth 328 of the adaptor body 318. A catch 331 in the shape of a plate is pivoted in a longitudinal end slot 332 in the lower end cap 209 and is urged to rotate out of the slot 332 by a spring 333 (Figs. 9 and 10). The adaptor head is fitted on to the lifting device by lining up the internal teeth 328 of the adaptor body 318 with the spaces 330 between the external teeth 326 of the lower end cap 209. The adaptor head is then pushed on to the lower end cap 209 of the lifting device so that the internal teeth 328 of the adaptor body 318 pass through the spaces 330 between the external teeth 326 of the lower end cap 209. The adaptor head is now rotated so that its internal teeth 328 are moved round the groove 327 in the lower end cap 209 of the lifting device until the teeth 328 are situated behind the external teeth 326 of the lower end cap 209. The adaptor head and the lifting device are locked together in this position by the catch 331 which engages with a slot 334 in the adaptor body 318. Referring again to Fig. 9. The three jaws 319 of the adaptor head are mounted in three longitudinal end slots 336 set at 120° intervals around the adaptor body 318. Each jaw 319 has an integral lever arm 337 and a crank 338 by means of which the jaw 319 is pivoted in the slot 336 on a pin 339.

Adjustable stops in the form of a screw 340 and a lock nut 341 are fitted to the lever arms 337 and make contact with the balls 241 of the lifting device. The locator nose 320 has a conical internal profile 342 and is mounted on the adaptor body 318 by three bolts 343 which pass through holes 344 in the body 318, and are screwed into the locator nose 320. The holes 344 are stepped in three parts, i.e. a central bearing part 345 for the shanks of the bolts 343, a part 347 of larger diameter to accommodate the heads 346 of the bolts 343 and a spring housing part 348. Compression springs 349 are contained within the spring housing parts 348 of the holes 344. The springs 349 act between the locator nose 320 and the bases 350 of the spring housings 348.

Referring to Fig. 10 the adaptor head shown attached to the lifting device is similar to that of Fig. 9 but is modified slightly to be suitable for picking up a fuel element 357 having a conically recessed cap 351 and three equally spaced radial legs 352. Normally this type of fuel element is picked up by means of an electromagnetic grab engaging with the legs 352. However, if the legs 352 of the fuel element are damaged so that the electromagnetic grab will not engage then the adaptor head shown in Fig. 10 is used. The same references are used for similar parts of the two adaptors of Figs. 9 and 10. Some of these parts are modified, viz. the body 318 is externally threaded to carry a spacer sleeve 353 and is of larger diameter. Spacer sleeves 353 of different external diameter can be fitted according to the size of hole into which the lifting device is to be lowered. The locator nose 320 has an external spherical profile 342 and is loaded by a single compression spring 349. This compression spring 349 acts between the base of a cavity 355 in the locator nose 320 and the end face 354 of the adaptor body 318.

The use of the modification of Fig. 9 in picking up a control rod 356 from the foot of its channel will now be described. In Fig. 9 the adaptor head is shown engaged with a control rod 356 prior to pick up, via jaws 319 held by the balls 241 which are located by the end 244 of the push rod 203.

The operation to this stage of engagement will now be described. The lifting device with the adaptor head of Fig. 9 fitted is lowered down the control rod channel with the locator nose 320 advanced by the springs 349 to a position indicated by the chain dotted lines 324. The actuator bellows for the push rod 203 of the lifting device is now pressurised which advances the push rod 203 so that it strikes the crank 338 of each jaw 319 and pivots the jaw 319 to the retracted position as shown by the dotted outline in Fig. 9. As the jaws 319 pivot to the retracted position so the lever arm 337 and the adjustor screw 341 drive the balls 241 into the groove 245 in the push rod 203 which has advanced opposite to the holes 242 of the spigot 211, with the advancement of the push rod 203. The lifting device is lowered until the locator nose 320 of the adaptor head engages with and is arrested by the control rod 356. As the locator nose 320 is arrested by the control rod 356 the main part of the lifting device and adaptor head moves downward under its own weight relative to the locator nose 320. The movement of the locator nose 320 relative to the adaptor body 318 moves the annular plate 270 of the lifting device to operate an electrical switch via the plungers 271 and the annular plate 268. The operation of the switch gives external indication that the lifting device has contacted the control rod 356 and the push rod actuator bellows is then depressurised which allows the push rod 203 to retract under spring loading. The retraction of the push rod 203 forces the balls 241 out into the holes 242 in the spigot 211 and the balls 241 pivot the jaws 319 to engage with the control rod 356 which can then be picked up.

The functioning of the adaptor head of Fig. 10 which will now be described has a likeness to the functioning of the adaptor head of Fig. 9. The locator nose 320 is adapted however to locate and align a fuel element 357 prior to engagement of the jaws 319 should one of the legs 352 be broken off or bent so that the fuel element 357 is leaning at an angle in its channel. The lifting device with the adaptor head of Fig. 10 fitted is lowered down the channel with the jaws 319 in the open position (as indicated by the chain dotted lines) until the locator nose 320 engages with the fuel element 357. The adaptor fitted to the lifting device is laterally located in the fuel element channel by the ring 353 carried by the adaptor head. The ring 353 is made of such a size as to just fit into the fuel element channel.

The fuel element 357 is moved to a vertical position in the channel by the locator nose 320 which is finally arrested when it is located at the bottom of the conically recessed end cap 351 of the element 357. The lifting device now moves downward under its own weight relatively to the arrested locator nose 320 of the adaptor head. Again the relative movement of the locator nose 320 operates an electrical switch to give external indication that the pick up device is positioned correctly and the jaws of the adaptor head are engaged with the conical end cap 351 of the fuel element 357 by depressurisation of the actuator bellows so that the fuel element 357 can be picked up.

We claim:

1. Apparatus for lifting a remotely positioned body, comprising a tubular casing, a flexible tubular cable adapted to pass actuating fluid therethrough and connected to one end of said casing, means for grasping said body mounted at the other end of said casing, means connected to said cable for controlling the flow of fluid therethrough, and fluid operated means mounted within said casing in engagement with said grasping means and communicating with said cable for actuating said grasping means in response to flow of fluid through said cable.

2. Apparatus according to claim 1 further comprising means mounted in said casing in communication with said controlling means and adapted to engage said body for actuating said controlling means in response to engagement with said body.

3. Apparatus according to claim 2 wherein said controlling means comprises an electromagnetically operated valve and said means for actuating said controlling means comprising a member movably mounted adjacent said grasping means and having first electrical contact means thereon, and second electrical contact means mounted adjacent the path of movement of said member, said first and second contact means being in circuit with said electromagnetically operated valve, whereby engagement of said first and second contact means with movement of said member energizes said valve.

4. Apparatus according to claim 1 wherein said grasping means comprises a pair of hooks mounted to pivot in opposite directions and said fluid operated actuating means comprises a shaft slidably mounted within said casing, means expansible in response to flow of fluid thereinto connected to one end of said shaft, and means coupling the other end of said shaft with said hooks, whereby sliding movement of said shaft with expansion and contraction of said expansible means causes counter-directional pivoting of said hooks.

References Cited in the file of this patent

UNITED STATES PATENTS

| 2,427,438 | Breaux | Sept. 16, 1947 |
| 2,544,142 | Dritley | Mar. 6, 1951 |
| 2,573,867 | Murray et al. | Nov. 6, 1951 |
| 2,705,167 | Layne et al. | Mar. 29, 1955 |
| 2,736,600 | Carlson | Feb. 28, 1956 |